United States Patent
Das et al.

(10) Patent No.: US 10,990,718 B2
(45) Date of Patent: Apr. 27, 2021

(54) METHOD AND DEVICE FOR GENERATING PHYSICAL DESIGN PARAMETERS OF AN OBJECT

(71) Applicant: WIPRO LIMITED, Bangalore (IN)

(72) Inventors: Rishav Das, Howrah (IN); Karanjit Singh, Tarn-Taran (IN)

(73) Assignee: Wipro Limited, Bangalore (IN)

( * ) Notice: Subject to any disclaimer, the term of this patent is extended or adjusted under 35 U.S.C. 154(b) by 644 days.

(21) Appl. No.: 15/883,472

(22) Filed: Jan. 30, 2018

(65) Prior Publication Data
US 2019/0179978 A1    Jun. 13, 2019

(30) Foreign Application Priority Data
Dec. 12, 2017  (IN) ............................ 201741044619

(51) Int. Cl.
G06F 30/20  (2020.01)
G06F 30/17  (2020.01)
G06F 119/18 (2020.01)

(52) U.S. Cl.
CPC .............. *G06F 30/20* (2020.01); *G06F 30/17* (2020.01); *G06F 2119/18* (2020.01)

(58) Field of Classification Search
CPC ....... G06F 30/20; G06F 30/17; G06F 2119/18
See application file for complete search history.

(56) References Cited

U.S. PATENT DOCUMENTS

| 2009/0083680 | A1* | 3/2009 | McConaghy | G06F 30/36 716/103 |
| 2009/0326875 | A1* | 12/2009 | Yanami | G06F 30/20 703/1 |
| 2017/0372480 | A1* | 12/2017 | Anand | G06T 19/20 |

(Continued)

FOREIGN PATENT DOCUMENTS

CN            104182379            12/2014

OTHER PUBLICATIONS

Ip et al. "Content-Based Classification of CAD models with Supervised Learning". Computer-Aided Design & Applications, vol. 2, No. 5, 2005, pp. 609-617 (Year: 2005).*

(Continued)

*Primary Examiner* — Eunhee Kim
(74) *Attorney, Agent, or Firm* — Finnegan, Henderson, Farabow, Garrett & Dunner, LLP

(57) ABSTRACT

This disclosure relates generally to machine design, and more particularly to method and system for generating physical design parameters of an object. In one embodiment, the method includes receiving a graphical design of the object along with a desired axis of rotation, categorizing the object into an object type based on the graphical design of the object and the desired axis of rotation of the object, and determining a regression weight and a regression estimate for each of the plurality of physical design parameters based on the object type, determining a plurality of proximity metrics based on the regression estimate for each of the plurality of physical design parameters, adjusting the regres- (Continued)

sion weight for each of the plurality of physical design parameters based on the plurality of proximity metrics, and generating a value for each of the plurality of physical design parameters based on the corresponding adjusted regression weight.

20 Claims, 13 Drawing Sheets

(56) References Cited

U.S. PATENT DOCUMENTS

2018/0018533 A1* 1/2018 Taranta, II ......... G06K 9/00416
2019/0179981 A1* 6/2019 Negishi ................ G06K 9/3241

OTHER PUBLICATIONS

Wang et al. "From Low-Cost Depth Sensors to CAD: Cross-Domain 3D Shape Retrieval via Regression Tree Fields". D. Fleet et al. (Eds.): ECCV 2014, Part I, LNCS 8689, pp. 489-504, 2014. Springer International Publishing Switzerland 2014. (Year: 2014).*
Xu Li-Li, "Moment of inertia based simple linear regression", *BTAIJ*, 10(4), 2014, pp. 1696-1701.

* cited by examiner

| | |
|---|---|
|  | A plank having a mass (M) is coupled to a point (P) at radius (R). The inertia (I) may be calculated as:<br>I = M(R*R) |
| 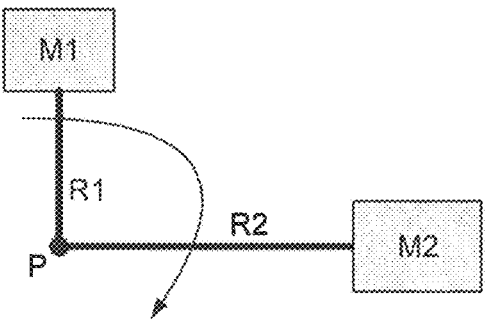 | Multiple planks are coupled to a single point of tension (P). The inertia (I) may be calculated as:<br>I = M1(R1*R1) + M2(R2*R2) |
| 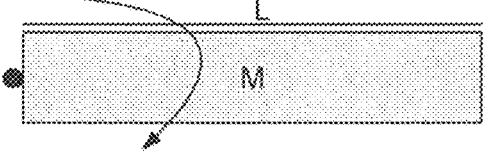 | A plank tends to rotate along its axis. The inertia (I) may be calculated as:<br>I = 1/3M(L*L) |
| 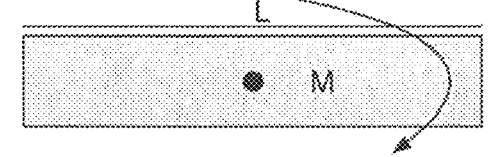 | A plank tends to rotate from its center of gravity (COG). The inertia (I) may be calculated as:<br>I = 1/12M(L*L) |
| 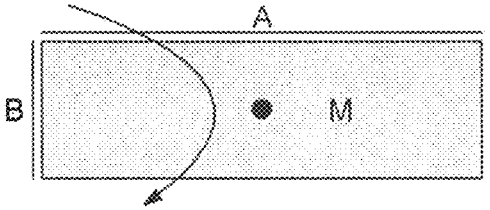 | A rectangular plank tends to rotate from its center of gravity (COG). The inertia (I) may be calculated as:<br>I = 1/12M(A*A + B*B) |
| 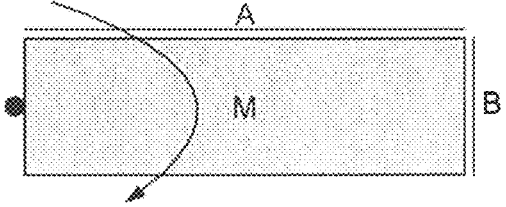 | A rectangular plank tends to rotate from its edge. The inertia (I) may be calculated as:<br>I = 1/3M(A*A + B*B) |

FIG. 4A

| | |
|---|---|
| 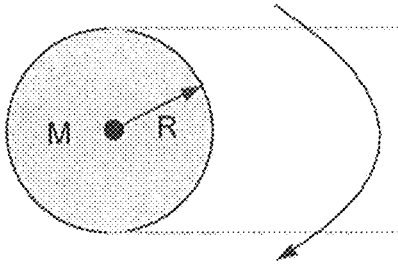 | For a circular plate, the inertia (I) may be calculated as:<br>$I = \frac{1}{2} M(R*R)$ |
| 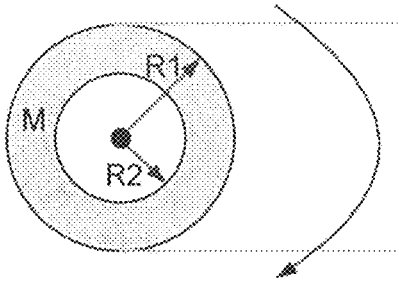 | For a flat ring circular plate, the inertia (I) may be calculated as:<br>$I = \frac{1}{2} M((R1*R1) + (R2*R2))$ |
| 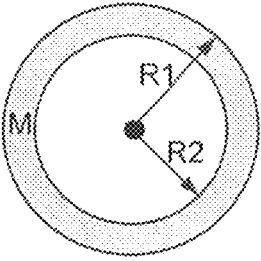 | For a thin ring circular plate, the inertia (I) may be calculated as:<br>$I = M(R1*R1)$<br>where R1 is approximately equal to R2 |
| 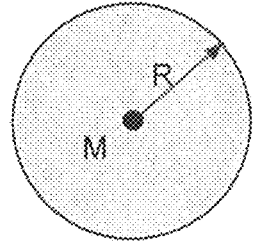 | For a solid sphere, the inertia (I) may be calculated as:<br>$I = 2/5\ M(R*R)$ |
| 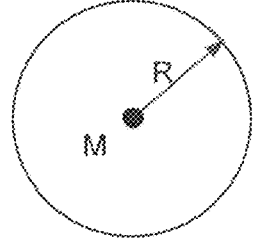 | For a hollow sphere, the inertia (I) may be calculated as:<br>$I = 2/3\ M(R*R)$ |

FIG. 4B

METHOD AND DEVICE FOR GENERATING PHYSICAL DESIGN PARAMETERS OF AN OBJECT

TECHNICAL FIELD

This disclosure relates generally to machine design, and more particularly to method and system for generating physical design parameters of an object.

BACKGROUND

In today's world, machines have become ubiquitous and are employed in almost every aspect of life. Examples of machines may include, but are not limited to, a variety of vehicles, appliances in home and office, farm machinery, factory automation systems, and robots. However, in most industries, machines may be designed based on roughly calculated mechanical patterns as per assumption, and followed by experimentation.

For example, assuming automotive engineers require to design a wheel chassis, which should have accuracy in rotation, but are uncertain about the mass or which material would decrease the mass so that the designed chassis requires less amount of rotation. In such a cases, a system may be required to understand the required mass for obtaining required force. Such understanding may help to increase the efficiency of the fuel, since less force may be required to rotate the wheel. Thus, such system may not only help the vehicle manufacturers but also help end users. In another example, while designing the curve end bending momentum of building, bridges or highways, the infrastructure designer may need to determine how much applied force would break up the infrastructure. In such cases, the virtual design may be built on workstation, and the tensile strength of the infrastructure may be determined from the virtual design.

As will be appreciated, most of the time, simulation of machines related to automobile, civil engineering, etc. may be done using software applications. However, existing software applications typically assume static physical design parameters for simulating inertia effect of machine design. It should be noted that the physical design parameters may include various combinations of mass, radius, acceleration; initial velocity, final velocity, time, distance, and displacement. Thus, existing software applications may not automatically generate adaptive and accurate physical design parameters for simulating inertia effect during machine design.

Some of the existing techniques provide for computation of moment of inertia using linear regression, such as, for uniformly distributed mass of rigid plate. However, existing techniques do not provide for generating self-learning and accurate physical design parameters for simulating inertia effect of machine design. Additionally, existing techniques are limited with respect to objects with different symmetrical or asymmetrical size and shape. In other words, existing techniques may not be suitable for generating adaptive physical design parameters for designing machine parts with different symmetrical and asymmetrical size and shape. Further, existing techniques do not provide for interactive generation of physical design parameters for machine parts of different size and shape.

SUMMARY

In one embodiment, a method for generating a plurality of physical design parameters of an object is disclosed. In one example, the method may include receiving a graphical design of the object along with a desired axis of rotation. The method may further include categorizing the object into an object type based on the graphical design of the object and the desired axis of rotation of the object. The method may further include determining a regression weight and a regression estimate for each of the plurality of physical design parameters based on the object type. The plurality of physical design parameters may include at least one of a mass, a radius, an acceleration, an initial velocity, a final velocity, a time, a distance, or a displacement of the object. The method may further include determining a plurality of proximity metrics based on the regression estimate for each of the plurality of physical design parameters. The method may further include adjusting the regression weight for each of the plurality of physical design parameters based on the plurality of proximity metrics. The method may further include generating a value for each of the plurality of physical design parameters based on the corresponding adjusted regression weight.

In one embodiment, a system for generating a plurality of physical design parameters of an object is disclosed. In one example, the system may include at least one processor and a memory communicatively coupled to the at least one processor. The memory may store processor-executable instructions, which, on execution, may cause the processor to receive a graphical design of the object along with a desired axis of rotation. The processor-executable instructions, on execution, may further cause the processor to categorize the object into an object type based on the graphical design of the object and the desired axis of rotation of the object. The processor-executable instructions, on execution, may further cause the processor to determine a regression weight and a regression estimate for each of the plurality of physical design parameters based on the object type. The plurality of physical design parameters may include at least one of a mass, a radius, an acceleration, an initial velocity, a final velocity, a time, a distance, or a displacement of the object. The processor-executable instructions, on execution, may further cause the processor to determine a plurality of proximity metrics based on the regression estimate for each of the plurality of physical design parameters. The processor-executable instructions, on execution, may further cause the processor to adjust the regression weight for each of the plurality of physical design parameters based on the plurality of proximity metrics. The processor-executable instructions, on execution, may further cause the processor to generate a value for each of the plurality of physical design parameters based on the corresponding adjusted regression weight.

In one embodiment, a non-transitory computer-readable medium storing computer-executable instructions for generating a plurality of physical design parameters of an object is disclosed. In one example, the stored instructions, when executed by a processor, may cause the processor to perform operations including receiving a graphical design of the object along with a desired axis of rotation. The operations may further include categorizing the object into an object type based on the graphical design of the object and the desired axis of rotation of the object. The operations may further include determining a regression weight and a regression estimate for each of the plurality of physical design parameters based on the object type. The plurality of physical design parameters may include at least one of a mass, a radius, an acceleration, an initial velocity, a final velocity, a time, a distance, or a displacement of the object. The operations may further include determining a plurality of proximity metrics based on the regression estimate for each of the plurality of physical design parameters. The operations may further include adjusting the regression weight for each of the plurality of physical design parameters based on the plurality of proximity metrics. The operations may further include generating a value for each of the plurality of physical design parameters based on the corresponding adjusted regression weight.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A-4C illustrate exemplary designed objects categorized into different object types in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
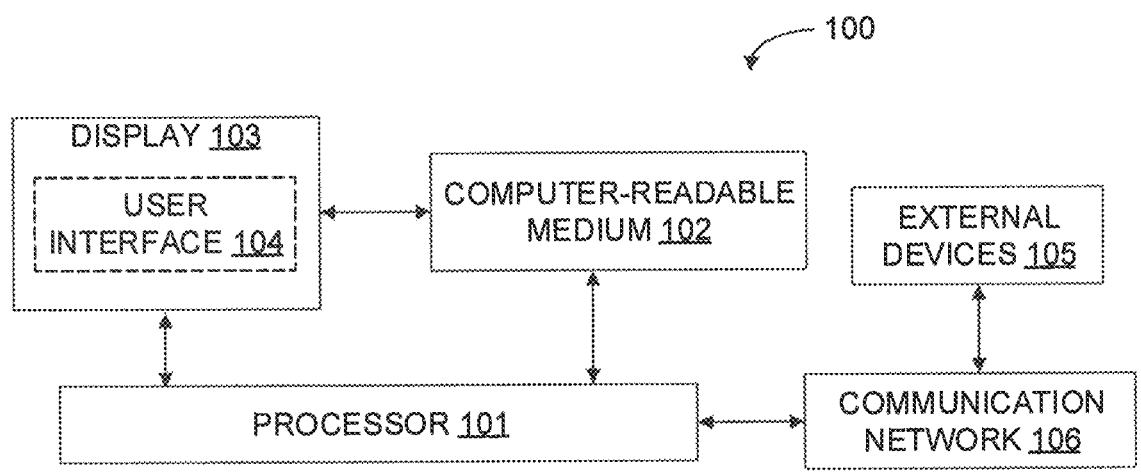
FIG. 1 is a block diagram of an exemplary system for generating physical design parameters of an object in accordance with some embodiments of the present disclosure.

Referring now to FIG. 1, an exemplary system 100 for generating physical design parameters of an object is illustrated in accordance with some embodiments of the present disclosure. In particular, the system 100 may include a design simulation device (e.g., desktop. laptop, notebook, or any other computing device) that implements a design simulation engine for generating physical design parameters of the object. As will be described in greater detail in conjunction with FIGS. 2-7, the design simulation engine may receive a graphical design of the object along with a desired axis of rotation, may categorize the object into an object type based on the graphical design of the object and the desired axis of rotation of the object, and may determine a regression weight and a regression estimate for each of the physical design parameters based on the object type. The physical design parameters may include, but may not be limited to, a mass, a radius, an acceleration, an initial velocity, a final velocity, a time, a distance, or a displacement of the object. Further, the design simulation engine may determine a plurality of proximity metrics based on the regression estimate for each of the plurality of physical design parameters, may adjust the regression weight for each of the plurality of physical design parameters based on the plurality of proximity metrics, and may generate a value for each of the plurality of physical design parameters based on the corresponding adjusted regression weight.

The system 100 may include one or more processors 101, a computer-readable medium (e.g., a memory) 102, and a display 103. The computer-readable storage medium 102 may store instructions that, when executed by the one or more processors 101, cause the one or more processors 101 to perform machine design and generate physical design parameters of the object in accordance with aspects of the present disclosure. The computer-readable storage medium 102 may also store various data (e.g., graphical design of object, shape of object, distribution of mass within the object, axis of rotation of the object, object type, list of object types, regression weigh, regression estimate, physical design parameters, ranking of the regression estimates, proximity metrics, observed values of physical design parameters, assumed values of physical design parameters, accurate values of physical design parameters, sample sets of physical design parameters, inertia effect of machine design, etc.) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
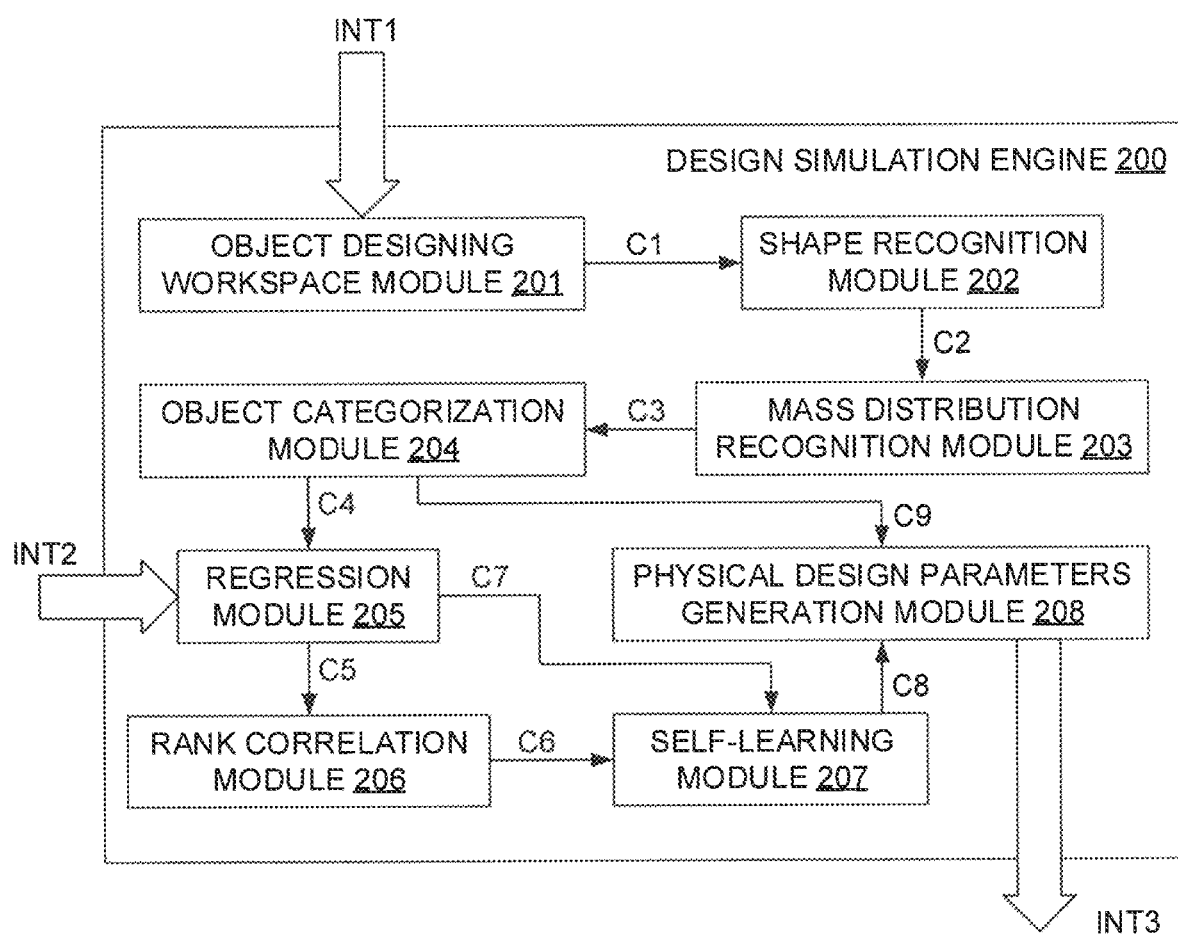
FIG. 2 is a functional block diagram of a design simulation engine in accordance with some embodiments of the present disclosure.

Referring now to FIG. 2, a functional block diagram of the design simulation engine 200 implemented by the system 100 of FIG. 1 is illustrated in accordance with some embodiments of the present disclosure. The design simulation engine 200 may include various modules that perform various functions so as to perform machine design and generate physical design parameters of the object. In some embodiments, the design simulation engine 200 may include an object designing workspace module 201, a shape recognition module 202, a mass distribution recognition module 203, an object categorization module 204, a regression module 205, a rank correlation module 206, a self-learning module 207, and a physical design parameters generation module 208. As will be appreciated by those skilled in the art, all such aforementioned modules 201-208 may be represented as a single module or a combination of different modules. Moreover, as will be appreciated by those skilled in the art, each of the modules 201-208 may reside, in whole or in parts, on one device or multiple devices in communication with each other.

The object designing workspace module 201 may facilitate designing of an object with a desired axis of rotation and a pivot element (e.g., a central point, or a shaft around which the object rotates or oscillates) through an INT1 interface.

Figure 3A:
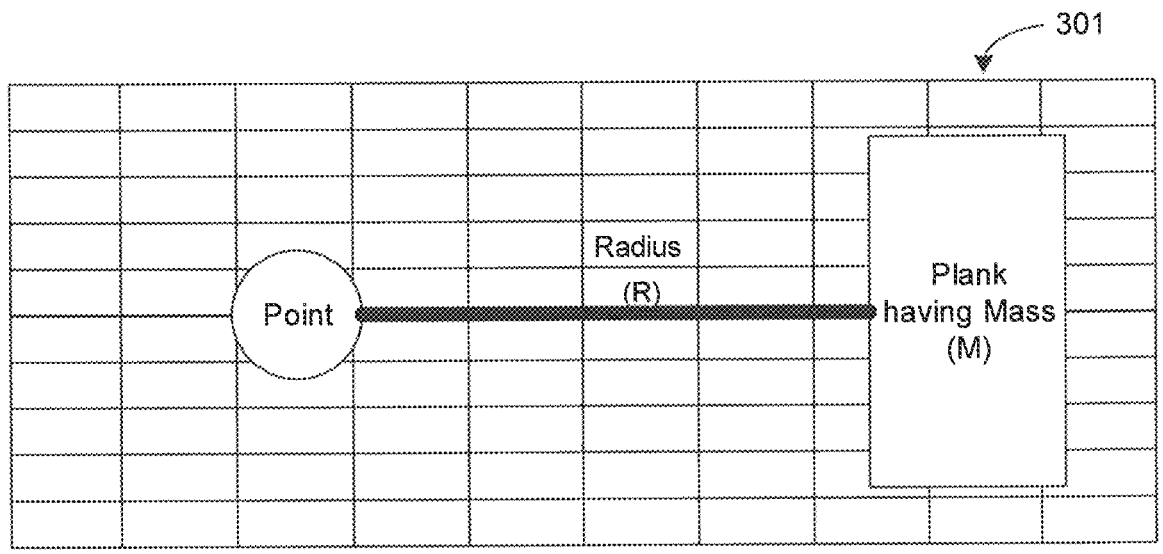
FIGS. 3A-3B are graphical representations of exemplary designed objects using an object designing workspace in accordance with some embodiments of the present disclosure.
Figure 3B:
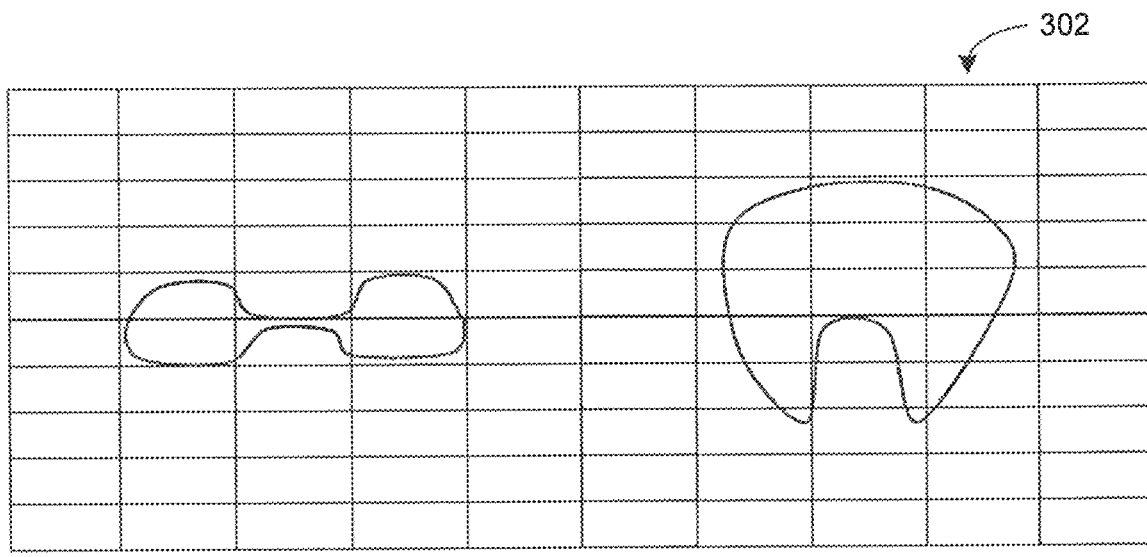

As will be appreciated, the INT1 interface may be an interface between the design simulation device and any of the input devices. The input device may include, but are not limited to, keyboard, mouse, joystick, touchscreen, touchpad, trackball, stylus, and so forth. Further, the object designing workspace module 201 may graphically represent the designed object on a suitable scale inbuilt within the workspace. In other words, the object designing workspace module 201 may provide for a graphical design of the object along with a desired axis of rotation and a pivot element. Referring now to FIGS. 3A-3B, graphical representations 301 and 302 of exemplary designed objects using the object designing workspace module 201 are illustrated, in accordance with some embodiments of the present disclosure. For example, FIG. 3A illustrates a graphical representation of a plank having a mass (M) and coupled to a pivot point at a distance or radius (R). As will be appreciated, the inertia (I) of the designed object may be computed as per equation (1) below:

$$I=M(R*R) \qquad \text{Equation (1)}$$

Referring back to FIG. 2, the shape recognition module 202 may receive the designed object from the object designing workspace module 201 via a C1 connector, and may determine a shape of the object based on the graphical design of the object. In some embodiments, the shape recognition module 202 may determine the shape of the designed object by analyzing a contour or a boundary of the object from the graphical design of the object. Further, the mass distribution recognition module 203 may receive the shaped recognized object from the shape recognition module 202 via a C2 connector, and may determine a distribution of mass within the object based on the shape of the object. In some embodiments, the mass distribution recognition module 203 may determine the distribution of mass within the object by analyzing a pixel area covered by the shaped recognized object. In particular, the mass distribution recognition module 203 may determine whether the distribution of the mass within the object is continuous or discontinuous. As will be appreciated, the INT2 interface may be an interface between the design simulation device and any of the input devices.

Figure 4C:
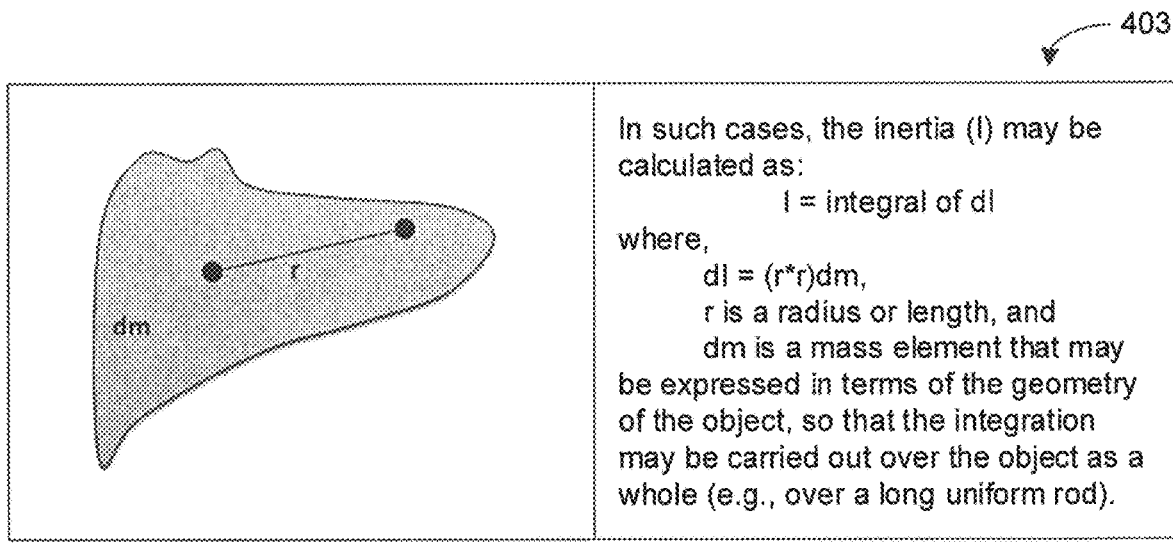

The object categorization module 204 may receive the mass distribution recognized object from the mass distribution recognition module 203 via a C3 connector, and may categorize the object into an object type from among various object types. In some embodiments, the object categorization module 204 may categorize the object based on the shape of the object, the distribution of mass within the object, and the desired axis of rotation of the object. The object types may include, but may not be limited to, a regular and continuous object, a regular mass object, a discontinuous mass object, and so forth. Referring now to FIGS. 4A-4C, exemplary designed objects categorized into different object types are illustrated, in accordance with some embodiments of the present disclosure.

For example, FIG. 4A illustrates exemplary designed objects belonging to the regular and continuous object type 601 along with their inertia (I). The objects such as flat planks, squares, rectangles, triangles, and so forth may belong to the regular and continuous object type 601. As will be appreciated, such objects may have distributed continuous mass. Further, such objects may be a part of any given system where the objects need to perform any motion operations (e.g., rotation, revolution, etc.). Additionally, for example, FIG. 4B illustrates exemplary designed objects belonging to the regular mass object type 602 along with their inertia (I). The objects having geometrical shapes related to circular or spherical, such as, circular plate, ring, solid sphere, hollow sphere, and so forth may belong to the regular mass object type 602. Further, for example, FIG. 4C illustrates exemplary designed objects belonging to the discontinuous mass object type 603 along with their inertia (I). The objects having random shape may belong to the discontinuous mass object type 603.

Referring back to FIG. 2, the regression module 205 may receive the categorized object from the object categorization module 204 via a C4 connector, and may determine a regression weight and a regression estimate for physical design parameters based on the object type. In some embodiments, the regression module 205 may provide an observed value or an assumed values of random physical design parameters in a sample set of physical design parameters depending on the object type. It should be noted that random physical design parameters may include one or more of mass, radius, acceleration, initial velocity, final velocity, time, distance, displacement, and so forth. Further, it should be noted that the observed or the assumed value of the physical design parameters may be user defined or default values. In some embodiments, the regression module 205 may receive the observed or the assumed value of the random physical design parameters for the sample set depending on the object type via an INT2 interface.

The regression module 205 may then perform a regression analysis among a set of related physical design parameters to determine the regression weight and the regression estimate for physical design parameters. The regression analysis may also be performed among inertia values. Thus, the regression analysis may be performed between two inertia values as well as between any related physical design parameters. The regression analysis may include, but may not be limited to, linear regression, multi regression, or nested regression. The regression analysis may be performed by applying suitable statistical algorithm including, but not limited to, linear regression analysis algorithm, multi regression analysis algorithm, or nested regression analysis algorithm.

The rank correlation module 206 may receive the regression estimate for physical design parameters from the regression module 205 via a C5 connector, and may determine proximity metrics based on the regression estimate for each of the physical design parameters. In some embodiments, the rank correlation module 206 may determine the proximity metrics by providing rank to the regression estimate for each of the physical design parameters in the sample set based on a proximity or a closeness between the regression estimate of the for each of the physical design parameters and the corresponding observed value or the corresponding assumed value for each of the physical design parameters in the sample set using a correlation analysis. In other words, the rank correlation module 206 may determine a relativity among each of the plurality of physical design parameters based on a correlation analysis.

The self-learning module 207 may receive the proximity metrics from the rank correlation module 206 via a C6 connector, and the regression weight from the regression module 205 via a C7 connector. The self-learning module 207 may then adjust the regression weight for each of the physical design parameters based on the plurality of proximity metrics. In some embodiments, the self-learning module 207 may adjust or fine tune the regression weight based on the determined proximity metrics for different sample sets collected over a period of time.

The physical design parameters generation module 208 may receive the adjusted regression weight from the self-learning module 207 via a C8 connector, and the categorized object from the object categorization module 204 via a C9 connector. The physical design parameters generation module 208 may then generate an accurate value for each of the physical design parameters by using the corresponding adjusted regression weight on the categorized object. The accurate value of the physical design parameters generated by the physical design parameters generation module 208 may be employed for simulating inertia effect of machine design using an INT3 interface. As will be appreciated, the INT3 interface may be an interface between the design simulation device and any of the standard output devices. The output device may include, but are not limited to, display device, printer, and so forth.

By way of an example, the techniques described above may automatically generate physical design parameters of an object for simulating inertia effect of machine design. The techniques may first categorize any designed object into a type of object based on a contour of the object, a distribution of mass within the object, and an axis of rotation of the object. Thereafter, the techniques may determine a regression weight and a regression estimate of physical design parameters by providing an observed value or an assumed value of random variables for a sample set of physical design parameters depending on the object type. The techniques may then determine the proximity metrics by providing rank to the regression estimation of the physical design parameters for a sample set based on the closeness between the assumed values of the physical design parameters and the regression estimate of the physical design parameters. The techniques may then adjust the regression weight based on determined proximity metrics for different sample sets collected continuously over a period of time. The techniques may then generate accurate values of the physical design parameters, by using the adjusted regression weight, for simulating inertia effect of machine design.

Figure 5A:
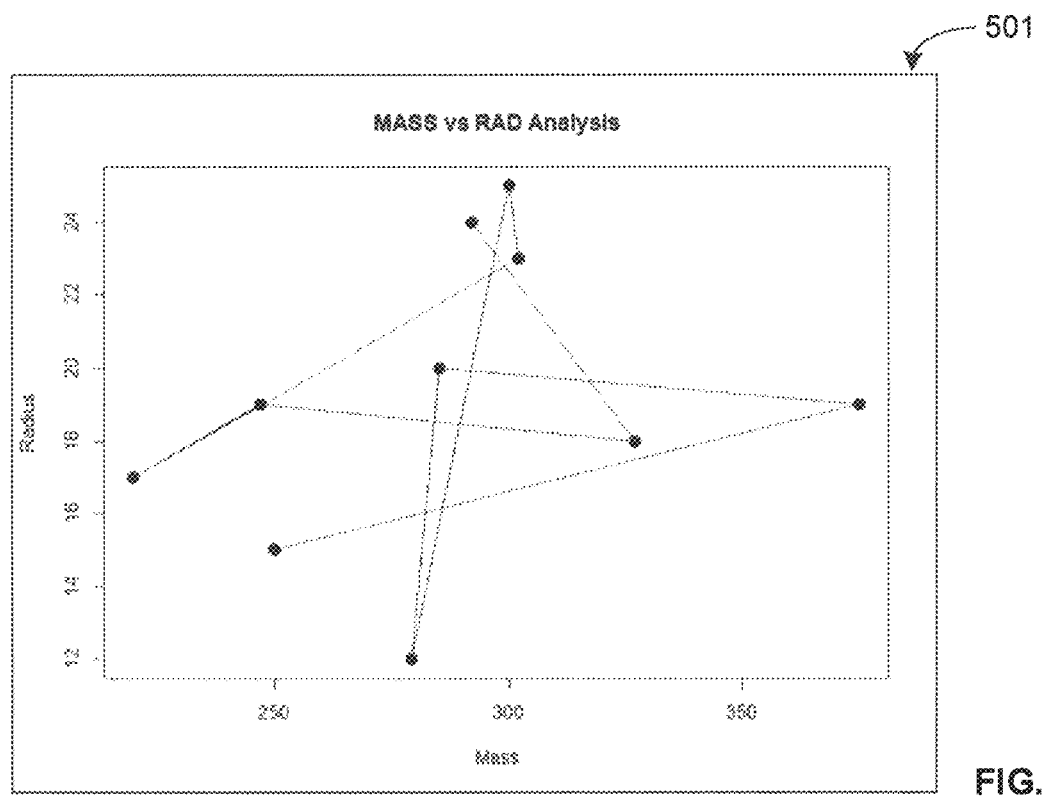
FIGS. 5A-5E illustrate exemplary graphical analysis while generating physical design parameters of an exemplary designed object in accordance with some embodiments of the present disclosure.
Figure 5B:
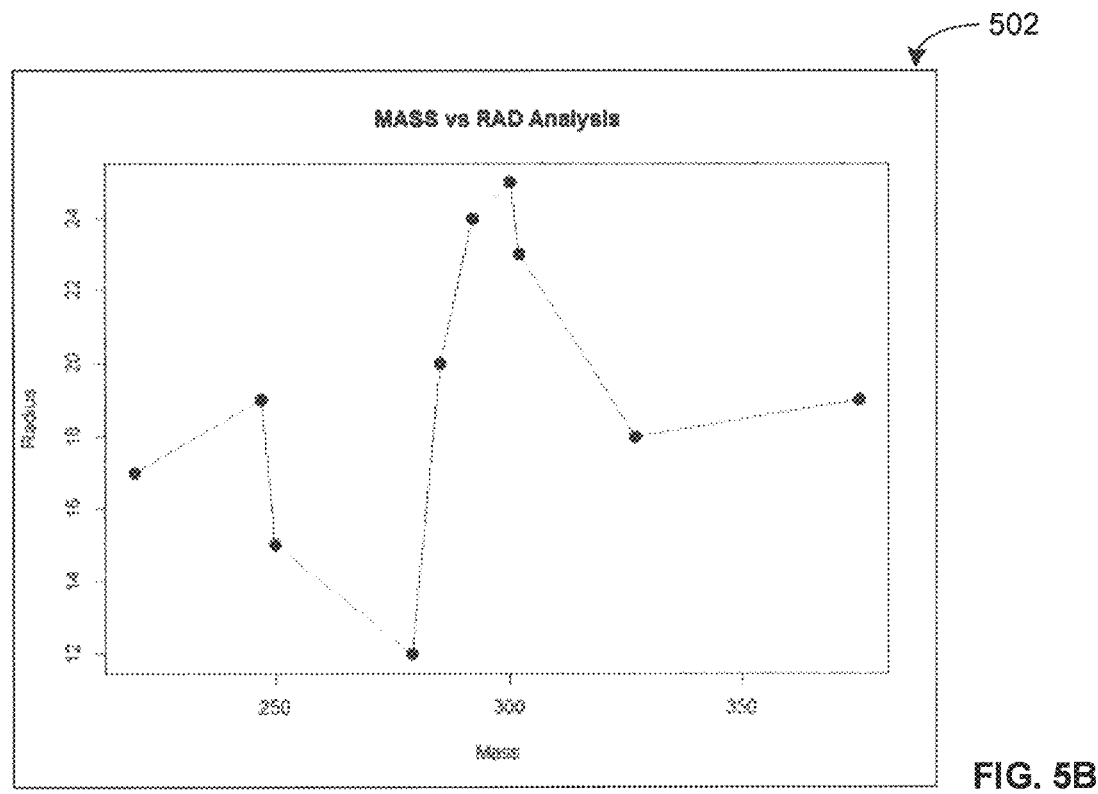
Figure 5C:
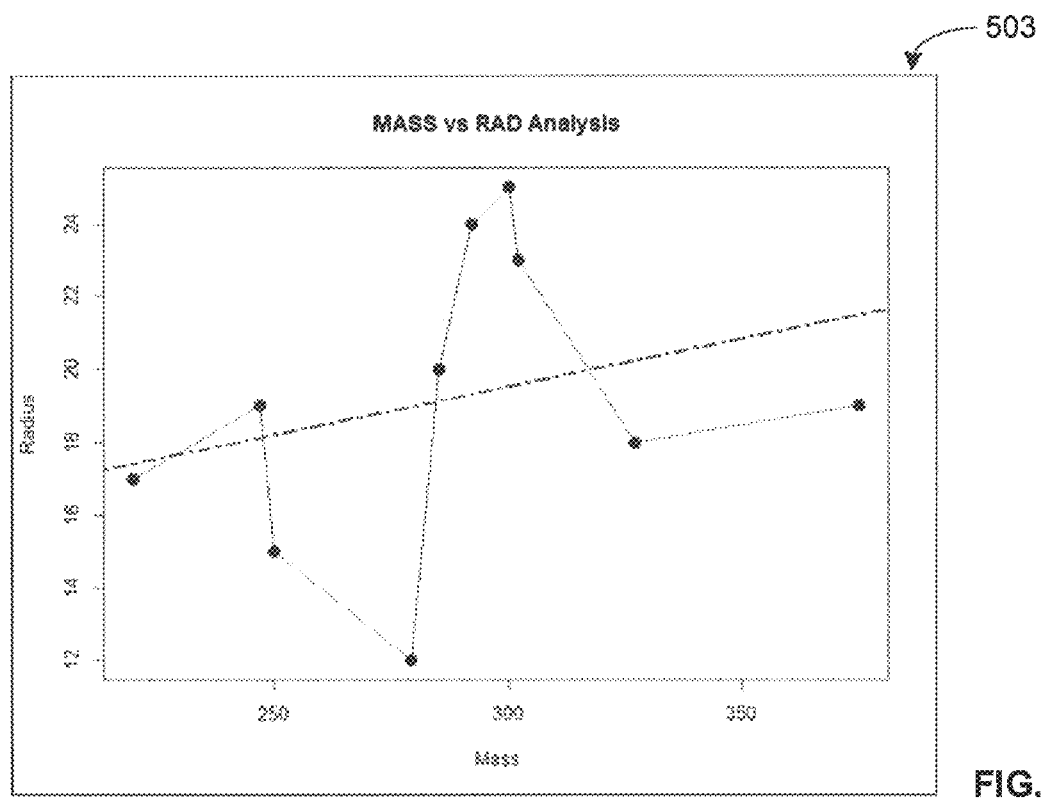
Figure 5D:
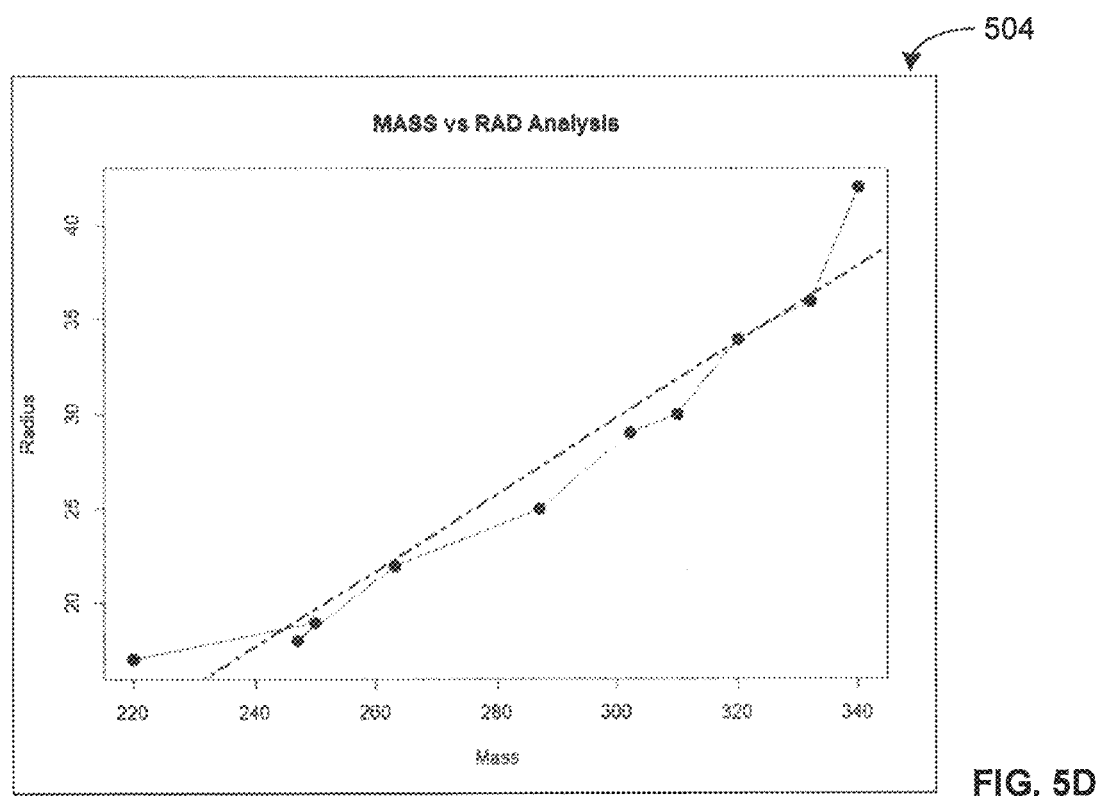
Figure 5E:
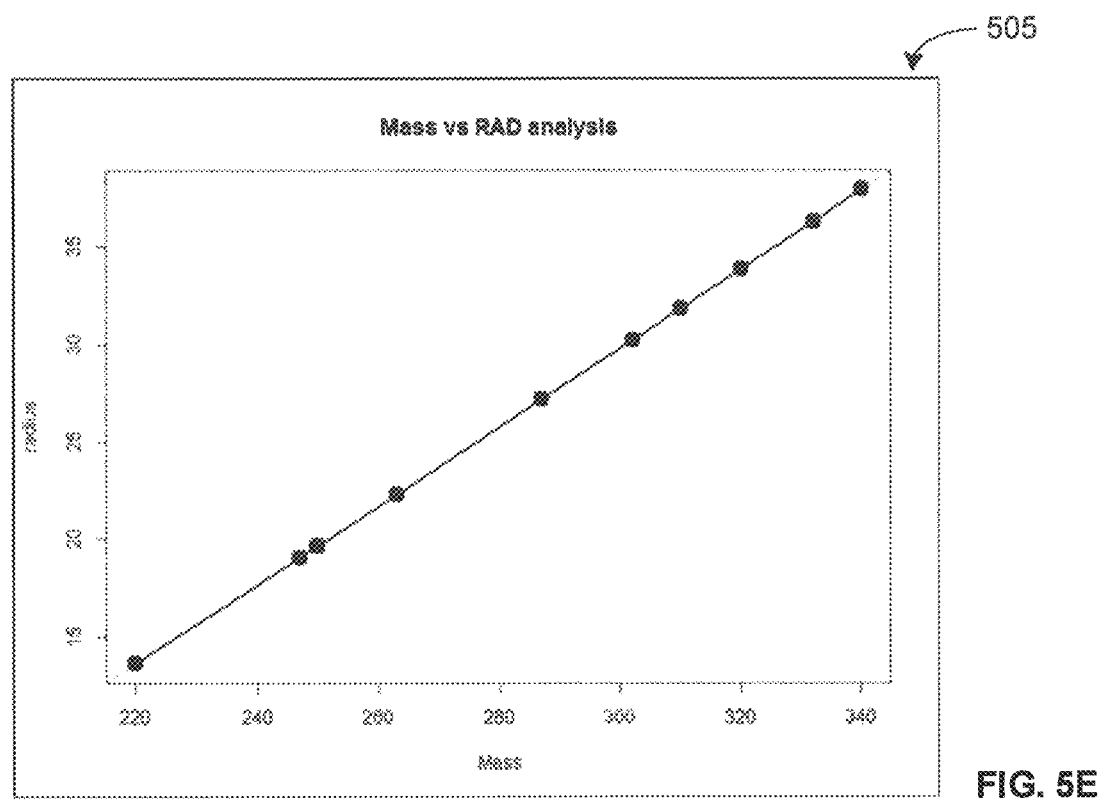

Referring now to FIGS. 5A-5E, exemplary graphical analysis, while generating physical design parameters of an exemplary designed object, is illustrated in accordance with some embodiments of the present disclosure. For example, FIG. 5A illustrates a graph 501 for regression analysis performed by taking values of mass and radius. Further, the techniques may determine that the linearity in the graph is not matching due to ranks, and therefore, may perform correlation rank analysis. FIG. 5B illustrates a graph 502 for correlation rank analysis performed subsequent to regression analysis. As will be appreciated, the regression line (if plotted) may provide for desired or exact value for the scattered plot datasets. FIG. 5C illustrates a graph 503 with the regression line plotted. After determining the regression estimates (or plotting the regression line), the techniques may predict the values and test on future or larger scale value datasets. FIG. 5D illustrates a graph 504 with the predicted values. As the previous datasets are now much correlated (say, about 80%), hence, the techniques may now perform tuning and training of the model again with new dataset by combining the old dataset and the new dataset. This results in further correlation of dataset (say, about 90%), and thus the prediction may be nearly perfect. The techniques may keep iterating the process of tuning and training of the model with new dataset by combining the old dataset and the new dataset till the prediction accuracy reaches about 95% or about 100%. In other words, the techniques described above may continuously tune and train the prediction model so as to achieve high level of (say, about 95% and above) accuracy. FIG. 5E illustrates a graph 505 with the predicted values after final tuning.

As will be appreciated, each of the connectors, C1-C9, may transfer data from one module 201-209 to the other module 201-209 using standard wired or wireless data connections means. For example, each of the connectors, C1-C9, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc.

It should be noted that the design simulation engine 200 may be implemented in programmable hardware devices such as programmable gate arrays, programmable array logic, programmable logic devices, and so forth. Alternatively, the design simulation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for performing machine design and generating physical design parameters of an object. For example, the exemplary system 100 and the associated design simulation engine 200 may automatically generate physical design parameters of an object for simulating inertia effect of machine design by the processes discussed herein. In particular, as will be appreciated by those of ordinary skill in the art, control logic and/or automated routines for performing the techniques and steps described herein may be implemented by the system 100 and the associated design simulation engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 6:
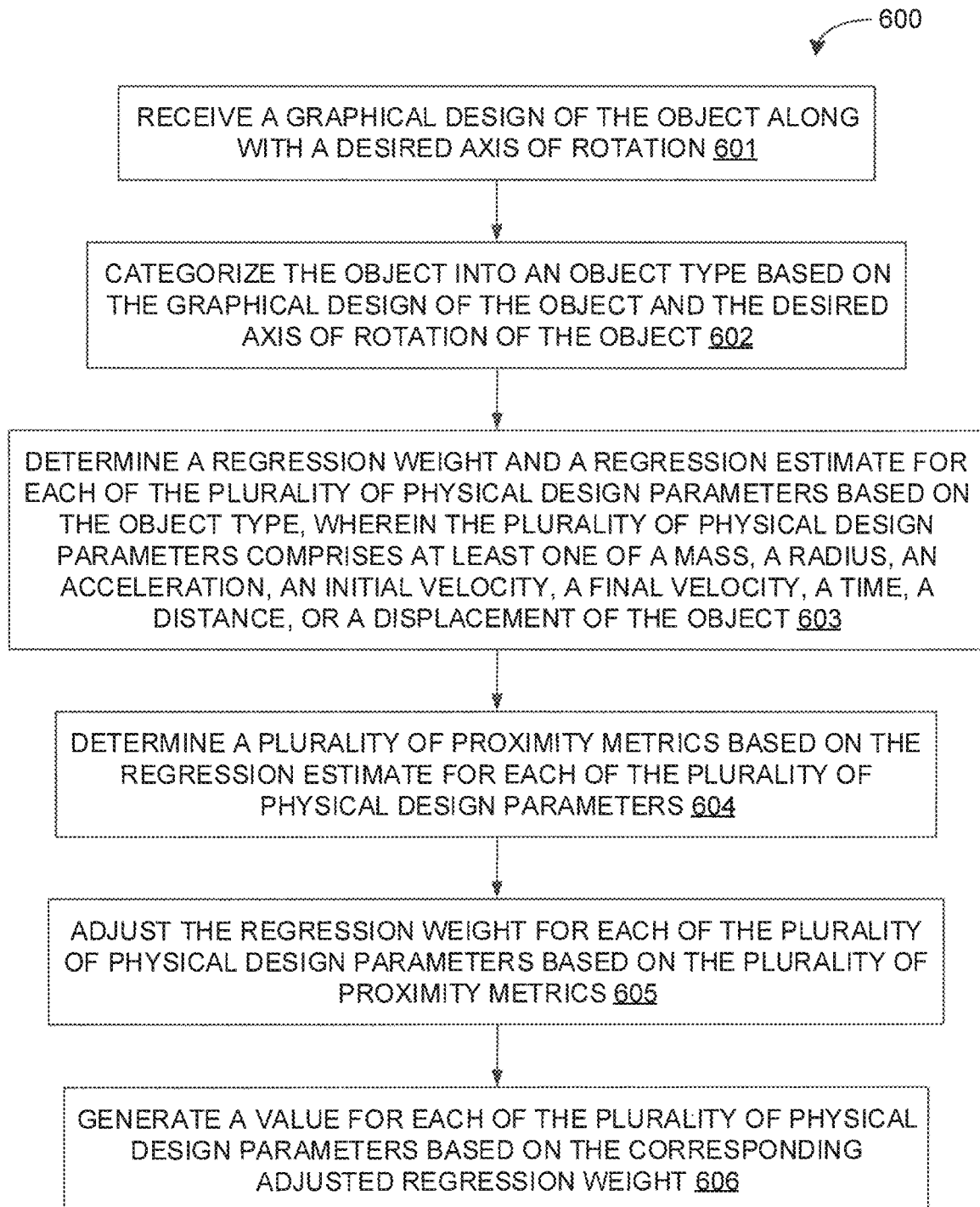
FIG. 6 is a flow diagram of an exemplary process for generating physical design parameters of an object in accordance with some embodiments of the present disclosure.

For example, referring now to FIG. 6, exemplary control logic 600 for generating physical design parameters of an object via a system, such as system 100, is depicted via a flowchart in accordance with some embodiments of the present disclosure. As illustrated in the flowchart, the control logic 600 may include the steps of receiving a graphical design of the object along with a desired axis of rotation at step 601, categorizing the object into an object type based on the graphical design of the object and the desired axis of rotation of the object at step 602, determining a regression weight and a regression estimate for each of the plurality of physical design parameters based on the object type at step 603, determining a plurality of proximity metrics based on the regression estimate for each of the plurality of physical design parameters at step 604, adjusting the regression weight for each of the plurality of physical design parameters based on the plurality of proximity metrics at step 605, and generating a value for each of the plurality of physical design parameters based on the corresponding adjusted regression weight at step 606. As stated above, the plurality of physical design parameters may include at least one of a mass, a radius, an acceleration, an initial velocity, a final velocity, a time, a distance, or a displacement of the object. Further, in some embodiments, the object type may be one of a plurality of object types. The plurality of object types may include at least one of regular and continuous object, regular mass object, or discontinuous mass object. Moreover, in some embodiments, the control logic 600 may include the step of simulating an inertia effect of machine design based on the generated values of the plurality of physical design parameters.

In some embodiments, categorizing the object at step 602 may include the steps of determining a shape of the object based on the graphical design of the object, determining a distribution of mass within the object based on the shape of the object, and categorizing the object based on the shape of the object, the distribution of mass within the object, and the desired axis of rotation of the object. Additionally, in some embodiments, determining the shape of the object may include analyzing a contour of the object from the graphical design of the object. Further, in some embodiments, determining the distribution of mass within the object may include analyzing a pixel area covered by the shape of the object, and wherein the distribution of mass is continuous or discontinuous.

In some embodiments, determining the regression weight and the regression estimate for each of the plurality of physical design parameters at step 603 may include the steps of providing an observed value or an assumed value for each of the plurality of physical design parameters in a sample set based on the object type, and performing a regression analysis among a set of related physical design parameters. Additionally, in some embodiments, performing the regression analysis may include applying statistical algorithm to perform at least one of linear regression, multi regression, or nested regression.

In some embodiments, determining the plurality of proximity metrics at step 604 may include the steps of ranking the regression estimate for each of the plurality of physical design parameters in the sample set based on a proximity with the corresponding observed value or the corresponding assumed value for each of the plurality of physical design parameters in the sample set using a correlation analysis, and determining the plurality of proximity metrics based on the ranking. Additionally, in some embodiments, determining the plurality of proximity metrics at step 604 may include determining a relativity among each of the plurality of physical design parameters based on a correlation analysis. Further, in some embodiments, adjusting the regression weight at step 605 may include adjusting the regression weight for each of the plurality of physical design parameters based on the plurality of proximity metrics for a plurality of sample sets over a period of time.

Figure 7:
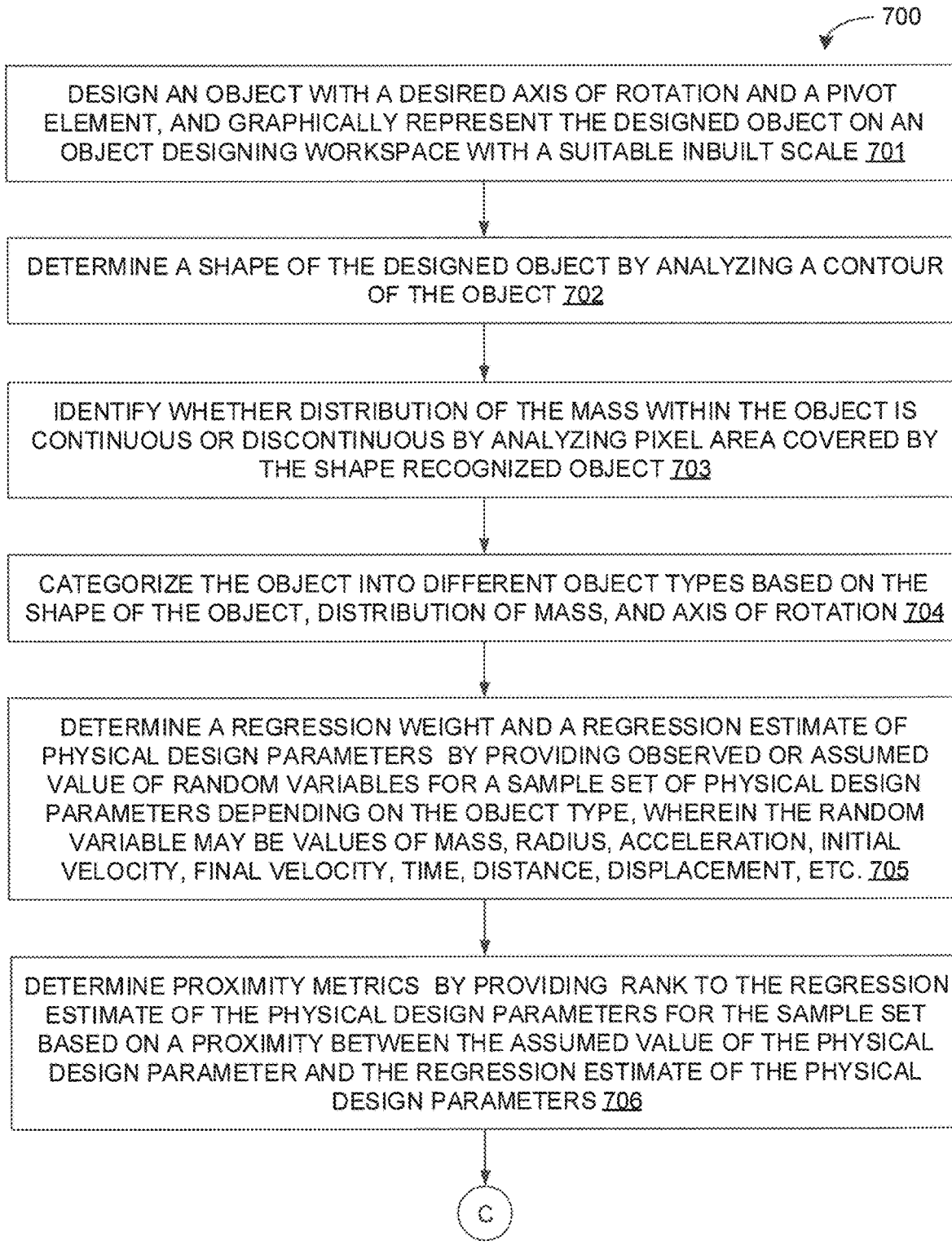
FIG. 7 is a flow diagram of a detailed exemplary process for generating physical design parameters of an object in accordance with some embodiments of the present disclosure.
Figure 7:
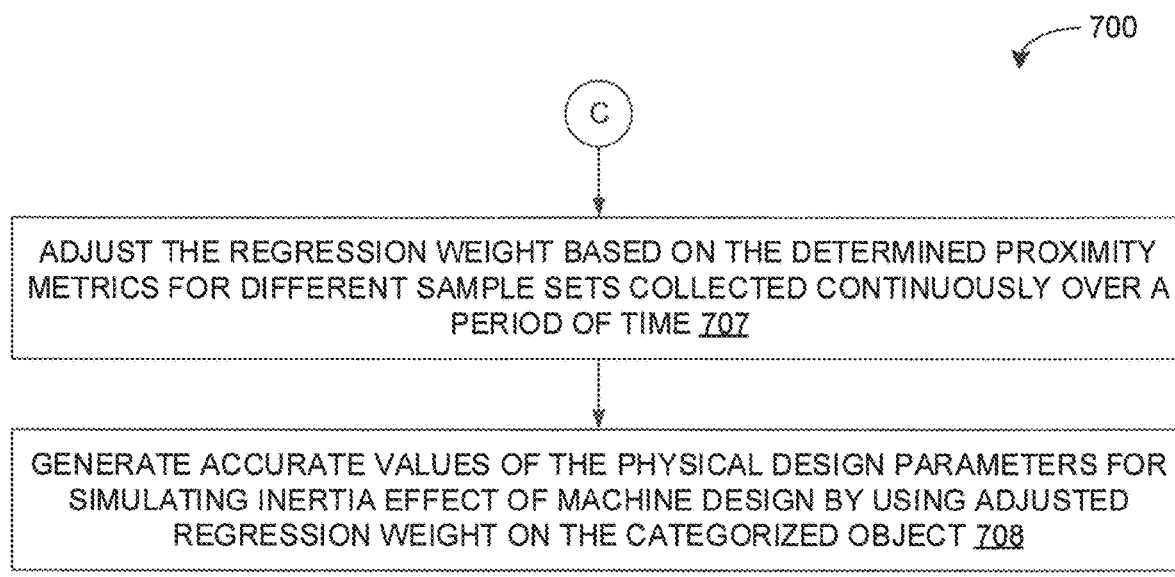
Figure 8:
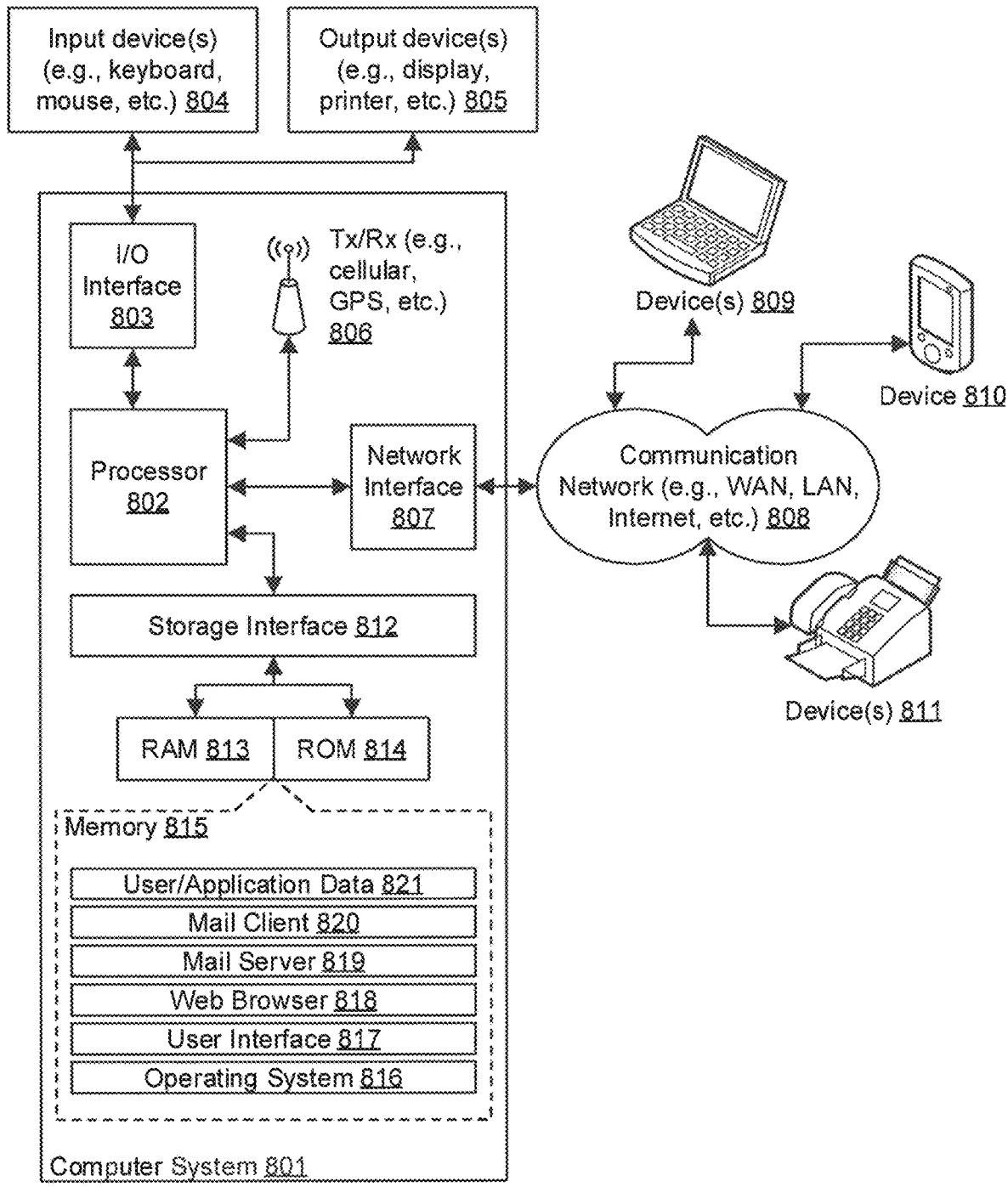
FIG. 8 is a block diagram of an exemplary computer system for implementing embodiments consistent with the present disclosure.

Referring now to FIG. 7, exemplary control logic 700 for automatically generating physical design parameters of an object for simulating inertia effect of machine design is depicted in greater detail via a flowchart in accordance with some embodiments of the present disclosure. As illustrated in the flowchart, the control logic 700 may start with designing an object with a desired axis of rotation and a pivot element, and thereafter, graphically representing the designed object on an object designing workspace with a suitable inbuilt scale at step 701. The control logic 700 may then proceed with determining a shape of the designed object by analyzing a contour of the object at step 702. The control logic 700 may then proceed with identifying whether the distribution of the mass within the object is continuous or discontinuous by analyzing pixel area covered by the shape recognized object at step 703. The control logic 700 may then proceed with categorizing the object into different object types based on the shape of the object, the distribution of the mass within the object, and the axis of rotation of the object at step 704.

Additionally, the control logic 700 may proceed with determining a regression weight and a regression estimate of physical design parameters by providing observed value or assumed value of random variables for a sample set of physical design parameters depending on the object type at step 705. It should be noted that the random variable may be values of mass, radius, acceleration, initial velocity, final velocity, time, distance, displacement, and so forth. In some embodiments, the regression weights may be determined by applying suitable statistical algorithm which may include, but may not be limited to, linear regression algorithm, multi regression algorithm, and nested regression algorithm. It should be noted that the regression may also be performed between two inertia values as well as between any two related physical parameters. The observed value or the assumed value of the physical design parameters may be user defined or default values.

Further, the control logic 700 may proceed with determining proximity metrics by providing rank to the regression estimates of the physical design parameters for the sample set based on a proximity or a closeness between the assumed values of the physical design parameters and the regression estimates of the corresponding physical design parameters at step 706. The control logic 700 may then proceed with adjusting or fine tuning the regression weight based on the determined proximity metrics for different sample sets collected continuously over a period of time at step 707. The control logic 700 may further proceed with generating accurate values of the physical design parameters for simulating inertia effect of machine design by using adjusted regression weight on the categorized object at step 708. The accurate values of the physical parameters generated may then be employed for simulating inertia effect of machine design.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer. Referring now to FIG. 7, a block diagram of an exemplary computer system 801 for implementing embodiments consistent with the present disclosure is illustrated. Variations of computer system 801 may be used for implementing system 100 for generating physical design parameters of an object for simulating inertia effect of machine design. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component.

The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., graphical design of object, shape of object, distribution of mass within the object, axis of rotation of the object, object type, list of object types, regression weigh, regression estimate, physical design parameters, ranking of the regression estimates, proximity metrics, observed values of physical design parameters, assumed values of physical design parameters, accurate values of physical design parameters, sample sets of physical design parameters, inertia effect of machine design, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for automatic generation of physical design parameters of an object for simulating inertia effect of machine design. As will be appreciated, generation of adaptive, self-learning, and dynamic physical design parameters may aid design engineers (e.g., automotive engineers) during designing of the object (e.g., wheel chassis) to understand inertia effect on the object (e.g., wheel). The techniques employ statistical algorithms, such as multi linear regression algorithm, nested regression algorithm, etc., which may aid to generate self-learning physical design parameters. Thus, the techniques fulfill a need for a system with inbuilt statistical model to generate self-learning physical design parameters for simulating inertia effect of machine design. Additionally, the techniques also allow user (e.g., designers) to interactively generate physical design parameters for machine parts of different symmetrical or asymmetrical size and shape. In short, the techniques described in the embodiments discussed above, facilitate generation of physical design parameters of an object, identifying the physical design of the object, and calculating the inertia of the design. The techniques further facilitate communication with human interface modules so as receive and process instructions to build better design in order to reduce the more resources.

As per different applications on real time environment, the techniques enable improving the work flow of any design process. For example, assuming automotive engineers require to design a wheel chassis, which should have accuracy in rotation, but are uncertain about the mass or which material would decrease the mass so that the designed chassis requires less amount of rotation. In such a cases, the present techniques described in the embodiments discussed above may help to understand the required mass for required force. In other words, the techniques help to increase the efficiency of the fuel as less force is required to rotate the wheel and therefore less amount of fuel required.

The specification has described method and system for generating physical design parameters of an object. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating a plurality of physical design parameters of an object, the method comprising:
    receiving, by a design simulation device, a graphical design of the object along with a desired axis of rotation;
    categorizing, by the design simulation device, the object into an object type based on the graphical design of the object and the desired axis of rotation of the object;
    determining, by the design simulation device, a regression weight and a regression estimate for each of the plurality of physical design parameters based on the object type, wherein the plurality of physical design parameters comprises at least one of a mass, a radius, an acceleration, an initial velocity, a final velocity, a time, a distance, or a displacement of the object;

determining, by the design simulation device, a plurality of proximity metrics based on the regression estimate for each of the plurality of physical design parameters;

adjusting, by the design simulation device, the regression weight for each of the plurality of physical design parameters based on the plurality of proximity metrics; and generating, by the design simulation device, a value for each of the plurality of physical design parameters based on the corresponding adjusted regression weight.

2. The method of claim 1, wherein the object type is one of a plurality of object types, and wherein the plurality of object types comprises at least one of regular and continuous object, regular mass object, or discontinuous mass object.

3. The method of claim 1, wherein categorizing the object comprises:

determining a shape of the object based on the graphical design of the object;

determining a distribution of mass within the object based on the shape of the object; and categorizing the object based on the shape of the object, the distribution of mass within the object, and the desired axis of rotation of the object.

4. The method of claim 3, wherein determining the shape of the object comprises analyzing a contour of the object from the graphical design of the object.

5. The method of claim 3, wherein determining the distribution of mass within the object comprises analyzing a pixel area covered by the shape of the object, and wherein the distribution of mass is continuous or discontinuous.

6. The method of claim 1, wherein determining the regression weight and the regression estimate for each of the plurality of physical design parameters comprises:

providing an observed value or an assumed value for each of the plurality of physical design parameters in a sample set based on the object type; and performing a regression analysis among a set of related physical design parameters.

7. The method of claim 6, wherein performing the regression analysis comprises applying statistical algorithm to perform at least one of linear regression, multi regression, or nested regression.

8. The method of claim 6, wherein determining the plurality of proximity metrics comprises:

ranking the regression estimate for each of the plurality of physical design parameters in the sample set based on a proximity with the corresponding observed value or the corresponding assumed value for each of the plurality of physical design parameters in the sample set using a correlation analysis; and determining the plurality of proximity metrics based on the ranking.

9. The method of claim 8, wherein adjusting the regression weight comprises adjusting the regression weight for each of the plurality of physical design parameters based on the plurality of proximity metrics for a plurality of sample sets over a period of time.

10. The method of claim 1, wherein determining the plurality of proximity metrics comprises determining a relativity among each of the plurality of physical design parameters based on a correlation analysis.

11. The method of claim 1, further comprising simulating an inertia effect of machine design based on the generated values of the plurality of physical design parameters.

12. A system for generating a plurality of physical design parameters of an object, the system comprising:

a design simulation device comprising at least one processor and a non-transitory computer-readable medium storing instructions that, when executed by the at least one processor, cause the at least one processor to perform operations comprising:

receiving a graphical design of the object along with a desired axis of rotation;

categorizing the object into an object type based on the graphical design of the object and the desired axis of rotation of the object;

determining a regression weight and a regression estimate for each of the plurality of physical design parameters based on the object type, wherein the plurality of physical design parameters comprises at least one of a mass, a radius, an acceleration, an initial velocity, a final velocity, a time, a distance, or a displacement of the object;

determining a plurality of proximity metrics based on the regression estimate for each of the plurality of physical design parameters;

adjusting the regression weight for each of the plurality of physical design parameters based on the plurality of proximity metrics; and generating a value for each of the plurality of physical design parameters based on the corresponding adjusted regression weight.

13. The system of claim 12, wherein categorizing the object comprises:

determining a shape of the object by analyzing a contour of the object from the graphical design of the object;

determining a distribution of mass within the object by analyzing a pixel area covered by the shape of the object, wherein the distribution of mass is continuous or discontinuous; and categorizing the object based on the shape of the object, the distribution of mass within the object, and the desired axis of rotation of the object.

14. The system of claim 12, wherein determining the regression weight and the regression estimate for each of the plurality of physical design parameters comprises:

providing an observed value or an assumed value for each of the plurality of physical design parameters in a sample set based on the object type; and performing a regression analysis among a set of related physical design parameters.

15. The system of claim 14, wherein determining the plurality of proximity metrics comprises:

ranking the regression estimate for each of the plurality of physical design parameters in the sample set based on a proximity with the corresponding observed value or the corresponding assumed value for each of the plurality of physical design parameters in the sample set using a correlation analysis; and determining the plurality of proximity metrics based on the ranking.

16. The system of claim 15, wherein adjusting the regression weight comprises adjusting the regression weight for each of the plurality of physical design parameters based on the plurality of proximity metrics for a plurality of sample sets over a period of time.

17. The system of claim 12, wherein the operations further comprise simulating an inertia effect of machine design based on the generated values of the plurality of physical design parameters.

18. A non-transitory computer-readable medium storing computer-executable instructions for:
- receiving a graphical design of the object along with a desired axis of rotation;
- categorizing the object into an object type based on the graphical design of the object and the desired axis of rotation of the object;
- determining a regression weight and a regression estimate for each of the plurality of physical design parameters based on the object type, wherein the plurality of physical design parameters comprises at least one of a mass, a radius, an acceleration, an initial velocity, a final velocity, a time, a distance, or a displacement of the object;
- determining a plurality of proximity metrics based on the regression estimate for each of the plurality of physical design parameters;
- adjusting the regression weight for each of the plurality of physical design parameters based on the plurality of proximity metrics; and
- generating a value for each of the plurality of physical design parameters based on the corresponding adjusted regression weight.

19. The non-transitory computer-readable medium of claim 18, wherein categorizing the object comprises:
- determining a shape of the object by analyzing a contour of the object from the graphical design of the object;
- determining a distribution of mass within the object by analyzing a pixel area covered by the shape of the object, wherein the distribution of mass is continuous or discontinuous; and
- categorizing the object based on the shape of the object, the distribution of mass within the object, and the desired axis of rotation of the object.

20. The non-transitory computer-readable medium of claim 18, wherein determining the regression weight and the regression estimate for each of the plurality of physical design parameters comprises:
- providing an observed value or an assumed value for each of the plurality of physical design parameters in a sample set based on the object type; and
- performing a regression analysis among a set of related physical design parameters;
- wherein determining the plurality of proximity metrics comprises:
- ranking the regression estimate for each of the plurality of physical design parameters in the sample set based on a proximity with the corresponding observed value or the corresponding assumed value for each of the plurality of physical design parameters in the sample set using a correlation analysis; and
- determining the plurality of proximity metrics based on the ranking; and wherein adjusting the regression weight comprises:
- adjusting the regression weight for each of the plurality of physical design parameters based on the plurality of proximity metrics for a plurality of sample sets over a period of time.

\* \* \* \* \*